United States Patent [19]

Suhara et al.

[11] 4,251,333

[45] Feb. 17, 1981

[54] ELECTROLYSIS OF AQUEOUS SOLUTION OF ALKALI METAL CHLORIDE

[75] Inventors: Manabu Suhara; Kiyotaka Arai, both of Yokohama, Japan

[73] Assignee: Asahi Glass Company, Ltd., Tokyo, Japan

[21] Appl. No.: 65,009

[22] Filed: Aug. 8, 1979

Related U.S. Application Data

[63] Continuation-in-part of Ser. No. 952,009, Oct. 17, 1978.

[30] Foreign Application Priority Data

Oct. 21, 1977 [JP] Japan .................. 52-125808

[51] Int. Cl.$^3$ .................. C25B 1/16; C25B 1/26; C25B 13/08
[52] U.S. Cl. .................. 204/98; 521/27
[58] Field of Search .................. 204/296, 252, 98, 128; 521/27

[56] References Cited

U.S. PATENT DOCUMENTS

| 4,123,336 | 10/1978 | Seko et al. ............ 204/98 |
| 4,151,053 | 4/1979 | Seko et al. ............ 204/296 X |

FOREIGN PATENT DOCUMENTS

52-24176 2/1977 Japan .

*Primary Examiner*—Arthur C. Prescott
*Attorney, Agent, or Firm*—Oblon, Fisher, Spivak, McClelland & Maier

[57] ABSTRACT

An electrolysis of an aqueous solution of an alkali metal chloride is carried out to produce an alkali metal hydroxide having a concentration of 30 wt. % or more and chlorine by using a modified cation exchange membrane of a fluorinated polymer having carboxylic acid type ion exchange groups, which has an ion exchange capacity of 1.0 to 2.2 meq/g.dry polymer and at least one of whose surface layer has lower ion exchange capacity which is from 45 to 95% of that of the main part.

10 Claims, No Drawings

ELECTROLYSIS OF AQUEOUS SOLUTION OF ALKALI METAL CHLORIDE

CROSS-REFERENCE TO RELATED APPLICATIONS

This application is a continuation-in-part of Ser. No. 952,009, filed Oct. 17, 1978.

BACKGROUND OF THE INVENTION

1. Field of the Invention

The present invention relates to an electrolysis of an aqueous solution of an alkali metal chloride. More particularly, it relates to an electrolysis of an aqueous solution of an alkali metal chloride to produce an alkali metal hydroxide having a concentration of 30 wt.% or more and chlorine in high current efficiency and low voltage by an ion exchange membrane electrolysis using a modified cation exchange membrane of a fluorinated polymer.

2. Description of the Prior Art

Recently, it has been proposed to employ an ion exchange membrane electrolysis using an ion exchange membrane instead of a conventional asbestos diaphragm so as to produce chlorine and an alkali metal hydroxide having high purity which does not include a raw material of an alkali metal chloride component. The electrolysis has been employed in an industrial operation.

In the electrolysis, a cation exchange membrane of a fluorinated polymer has been used as the ion exchange membrane from the viewpoint of chlorine resistance and alkali resistance. It has been known that the cation exchange membrane of a fluorinated polymer having carboxylic acid ion exchange groups is especially superior, as an ion exchange membrane for an electrolysis of an alkali metal chloride, to those of ion exchange membrane having sulfonic acid groups as the ion exchange groups because an alkali metal hydroxide and chlorine can be produced in high current efficiency even if the concentration of an alkali hydroxide solution is high. (The U.S. Pat. Nos. 4,065,366 and 4,116,888)

The cation exchange membrane of a fluorinated polymer having carboxylic acid type ion exchange groups which has an ion exchange capacity of 0.8 to 2.2 meq/g. dry polymer has been reported to have good characteristics, generally.

The characteristics of the ion exchange membrane are varied and a concentration of an alkali metal hydroxide obtained in high current efficiency is varied depending upon the ion exchange capacity.

According to the inventors studies, it is found that the ion exchange membrane having a smaller ion exchange capacity is advantageous for producing alkali metal hydroxide having a lower concentration whereas the ion exchange membrane having a larger ion exchange capacity is advantageous for producing alkali metal hydroxide having a higher concentration.

Thus, an alkali metal hydroxide having a lower concentration can be produced in higher current efficiency by using an ion exchange membrane having a lower ion exchange capacity. In this case, the ion exchange capacity is low whereby an electrical resistance of the membrane is large and a cell voltage is disadvantageously higher. On the other hand, when the ion exchange membrane having a larger ion exchange capacity is used for producing an alkali metal hydroxide having a lower concentration, the current efficiency itself is disadvantageously low.

The inventors have studied to overcome said disadvantageous in the production of an alkali metakl hydroxide having a concentration of 30 wt.% or higher and to provide an electrolysis of an aqueous solution of an alkali metal chloride in high current efficiency and low voltage. As the result, the inventors have found that the purpose can be satisfied by modifying a surface of the cation exchange membrane of a fluorinated polymer.

SUMMARY OF THE INVENTION

It is an object of the present invention to provide an electrolysis of an aqueous solution of an alkali metal chloride to produce an alkali metal hydroxide having a concentration of 30 wt.% or higher and chlorine in high current efficiency and low voltage.

The foregoing and other objects of the present invention have been attained by providing an electrolysis of an aqueous solution of an alkali metal chloride which comprises using a modified cation exchange membrane of a fluorinated polymer having carboxylic acid type ion exchange groups which has an ion exchange capacity of 1.0 to 2.2 meq/g. dry polymer and at least one of whose surface layer has an ion exchange capacity which is from 45 to 95% of an ion exchange capacity of the main part.

DETAILED DESCRIPTION OF THE PREFERRED EMBODIMENTS

In accordance with the present invention, excellent current efficiency can be provided similar to those of the membrane having an ion exchange capacity suitable for the concentration of an alkali metal hydroxide to be produced whereas an electrolytic voltage can be reduced similar to those of the membrane having an ion exchange capacity suitable for producing an alkali metal hydroxide having a higher concentration, when an alkali metal hydroxide having a concentration of 30 wt.%. or more especially from 35–40 wt.% is produced. Accordingly, the electrolysis of the present invention is significantly advantageous in the electrolysis for a long term in the industrial operation from the viewpoint of a reduction of electric energy.

The membrane having a large ion exchange capacity suitable for producing an alkali metal hydroxide in high concentration is advantageously used as the cation exchange membrane having groups of —COOM wherein M represents hydrogen or an alkali metal atom (hereinafter referring to as carboxylic acid type ion exchange groups) used in the present invention.

The electric resistance of the membrane is reduced depending upon an increase of the ion exchange capacity of the membrane. Accordingly, from the viewpoint of a reduction of a cell voltage, it is advantageous to increase the ion exchange capacity of the membrane. However, when the ion exchange capacity is too large, a molecular weight of a fluorinated polymer for the membrane is lower whereby a fabrication of the membrane is disadvantageously difficult. Thus, the ion exchange capacity of the cation exchange membrane of a fluorinated polymer used in the present invention is preferably in a range of 1.0 to 2.2 meq/g. dry polymer especially 1.1 to 2.0 meq/g. dry polymer.

The cation exchange membrane having carboxylic acid groups as the ion exchange groups can be prepared by using various kinds of fluorinated polymers especially copolymers obtained by copolymerizing a fluorinated olefin monomer and a comonomer having a functional group of carboxylic acid type group or a group which can be converted to carboxylic acid type group.

The fluorinated olefin monomers and the comonomers having the carboxylic acid type functional group can be selected as desired and especially can be selected respectively to form the units of $$\text{+CF}_2\text{—CXX'+} \quad (a)$$
and
$$\text{+CF}_2\text{—CX+} \atop | \atop Y \quad (b)$$

wherein X represents fluorine, chlorine, hydrogen or —CF$_3$; X' represents X or CF$_3$(CF$_2$)$_m$; m represents 1 to 5; and Y represents $$\text{+CF}_2\text{)}_{\overline{p}}\text{A}, \quad \text{—O+CF}_2\text{)}_{\overline{p}}\text{A}, \quad \text{+O—CF}_2\text{—CF)}_{\overline{p}}\text{A}, \atop | \atop Z$$

$$\text{+O—CF}_2\text{—CF)}_{\overline{p}}\text{+O—CF}_2\text{—CF)}_{\overline{q}}\text{A}, \atop | \quad\quad\quad | \atop Z \quad\quad R_f$$

$$\text{—O—CF}_2\text{—(CF—O—CF}_2\text{)}_{\overline{p}}\text{+CF}_2\text{)}_{\overline{q}}\text{(CF}_2\text{—O—CF)}_{\overline{r}}\text{A}, \atop | \quad\quad\quad\quad\quad\quad\quad\quad | \atop Z \quad\quad\quad\quad\quad\quad\quad R_f$$

$$\text{+CF}_2\text{)}_{\overline{p}}\text{+CH}_2\text{)}_{\overline{q}}\text{A};$$

p, q and r respectively represent 1 to 10; Z and R$_f$ respectively represent —F or a C$_1$-C$_{10}$ perfluoroalkyl group; A represents carboxylic acid type group or a functional group which can be converted to carboxylic type group in a hydrolysis or a neutralization such as —CN, —COF, —COOR$_1$ and —CONR$_2$R$_3$; R$_1$ represents a C$_1$-C$_{10}$ alkyl group; M represents hydrogen or an alkali metal atom and R$_2$ and R$_3$ respectively represents hydrogen or a C$_1$-C$_{10}$ alkyl group.

In the case of the copolymer having the units of (a) and (b), the ratio of the units (a) to the units (b) is selected so as to give the units (b) in the copolymer for providing a desired ion exchange capacity.

In the preparation of the fluorinated polymer, one or more monomer for the unit (a) and one or more monomer for the unit (b) are used. It can be modified by copolymerizing one or more other monomer such as monomers having the formula $$CF_2=CFOR_f$$

wherein R$_f$ represents a C$_1$-C$_{10}$ perfluoroalkyl group; and divinyl monomers having the formula $$CF_2=CF—CF=CF_2$$

$$CF_2=CFO(CF_2)_{1-4}OCF=CF_2$$

to crosslink the copolymer so as to improve the mechanical strength of the resulting membrane.

The fluorinated polymer used in the present invention can be a graft copolymer or a block copolymer.

The molecular weight of the fluorinated polymer for the cation exchange membrane concerns with the mechanical and electrical characteristics of the membrane and the fabricatability of the membrane.

When the molecular weight is shown by the temperature (T$_Q$) to give a volumetric melt flow rate of 100 mm$^3$/sec. which is below defined, it is preferable to give T$_Q$ of 130° to 350° C. especially 160° to 300° C.

To the fluorinated polymer for the cation exchange membrane can be blended a polymer of olefin such as polyethylene and polypropylene, a polytetrafluoroethylene or a fluorinated copolymer of ethylene and tetrafluoroethylene before or during fabricating into a cation exchange membrane having carboxylic acid type functional groups.

It is also possible to reinforce the cation exchange membrane with a supporter of a fabric such as a cloth, a net, a nonwoven fabric, fibrils or a porous film which is made of said polymer.

The weight of the blended polymer and the reinforcing material of the polymer is not calculated for the ion exchange capacity.

The fabrication of the membrane can be carried out by a suitable method such as a press fabrication, a roll fabrication, an extrusion fabrication, a solution casting method, a dispersion casting method and a powder molding method. It is important to fabricate the non-porous membrane, because of the necessity of the ion exchange membrane for selectivity permeating only specific ions under substantially preventing a permeation of an electrolyte in the electrolysis.

A water permeability of the membrane is preferably less than 100 ml/hour/m$^2$ especially less than 10 ml/hour/m$^2$ under a head pressure of 1 mH$_2$O.

A thickness of the membrane is preferably in a range of 20 to 1000$\mu$ especially 50 to 500$\mu$.

When the ion exchange groups of the cation exchange membrane are functional groups, such as —CN, —COF, —COOR$_1$, —CONR$_2$R$_3$ and (R$_1$ to R$_3$ are defined above), the functional groups are converted to carboxylic acid type ion exchange groups by a hydrolysis or a neutralization with an acid or an alcohol solution of a base, before using the membrane in the electrolysis of the present invention.

The cation exchange membrane of a fluorinated polymer is modified by reducing the ion exchange capacity of at least one surface layer of the membrane before using the membrane in the electrolysis of an aqueous solution of an alkali metal chloride.

A thickness of the surface layer of the membrane to be modified can be quite thin to attain the purpose of the present invention. This is advantageous to prevent an increase of the electric resistance of the membrane.

According to the inventors' study the thickness of the modified surface layer is preferably in a range of 0.1 to 50$\mu$ especially 0.5 to 30$\mu$.

When the thickness is in less than said range, the effect of the present invention is low and the durability of the effect is low whereas when it is greater than said range, the electric resistance is too high.

The ion exchange capacity of the modified surface layer is important to attain the purpose of the present invention. The suitable ion exchange capacity is dependent upon a required concentration of an alkali metal hydroxide in the electrolysis.

When higher concentration of an alkali metal hydroxide is produced, a greater ion exchange capacity is required, whereas when lower concentration of an alkali metal hydroxide is produced, a less ion exchange capacity is required.

Thus, when an alkali metal hydroxide at a concentration of 30 wt.% or more is produced, the ion exchange capacity of modified surface layer is controlled in a range of 0.9 to 1.6 meq/g. dry polymer especially 1.0 to 1.5 meq/g. dry polymer.

When the ion exchange capacity is less than said range, the electric resistance of the membrane is high and the current efficiency is small whereas when it is greater than said range, the current efficiency is too small to attain the purpose of the present invention.

It has been found to be further advantageous by applying the modifying treatment to a surface layer of the membrane in one side, especially the surface layer facing a cathode in an electrolytic cell from the viewpoints of the current efficiency and the electrolytic voltage.

Various methods can be employed for reducing the ion exchange capacity of the surface layer of the membrane.

For example, it is possible to bond a thin cation exchange membrane having a lower ion exchange capacity on a surface of the cation exchange membrane. However, the fabrication for bonding is troublesome and the bonded or melt-bonded layer is liable to become ununiform whereby the thin membrane may be peeled off or ballooned and the electric resistance may be disadvantageously high.

In the present invention, it is preferable to modify the surface layer by the method based on the phenomenon that carboxylic acid groups of the cation exchange membrane are decomposed in an alkali metal hydroxide in high concentration at high temperature. According to the inventors study, carboxylic acid groups of the membrane are remarkably unstable and are gradually decomposed in an alkali metal hydroxide in high concentration of higher than 40 wt.% at higher than 80° C. It is preferable to contact the surface of the cation exchange membrane with a concentration of an alkali metal hydroxide of 45 to 90 wt.% at higher than 80° C. especially a concentration of 50 to 75 wt.% at 90° to 120° C.

In the present invention, it is possible to use the alkali metal hydroxide solution lower than above-mentioned. In such case, however, it takes higher temperature and long time. When the concentration is low, it is necessary to treat at high temperature such as higher than 140° C. for a long time.

The time for contacting with the alkali metal hydroxide is selected so as to give suitable ion exchange capacity of the surface layer of the membrane. It is preferable in a range of 30 minutes to 100 hours especially 4 to 40 hours.

When the cation exchange membrane is treated by contacting with an alkali metal hydroxide, at least peripheral parts of two sheets of the cation exchange membranes are bonded to form a bag type unit and the bag type unit is dipped in an aqueous solution of an alkali metal hydroxide whereby the cation exchange membranes whose surface layer in one side is modified to decrease the ion exchange capacity, can be easily obtained.

According to the studies by the inventors, when the carboxylic acid type the ion exchange groups of the cation exchange membrane are in ester type and the superposed cation exchange membranes are pressed at suitable temperature 10°–50° C. under a pressure of 0.1–10 kg/cm² (Gauge), the peripheral parts of the two sheets of the cation exchange membranes are sufficiently bonded without any special treatment.

After the treatment by contacting the bag type unit with an alkali metal hydroxide to modify the surface layer to decrease the ion exchange capacity, the carboxylic acid ester groups of the membrane are hydrolyzed to convert them to carboxylic acid groups or alkali metal salt groups thereof whereby the bonded two sheets of the cation exchange membranes are easily peeled off. When the cation exchange membranes is not the carboxylic acid ester type, the peripheral parts of the two sheets of the cation exchange membrane are bonded with a sealing material such as tetrafluoroethylene polymers adhesive and other adhesives.

The contacting treatment by the alkali metal hydroxide in the present invention can be easily attained by treating the membrane under the above-mentioned conditions of the concentration of the alkali metal hydroxide and the temperature in the cathode compartment in an electrolysis of an aqueous solution of an alkali metal chloride. Accordingly, it is significantly effective in the treatment.

The other method of modifying the surface layer in the present invention is to decompose the carboxylic acid groups by treating with an amine such as $NH_2$—$(CH_2)_{2-10}$—$NH_2$ on the surface layer and heating preferably at 150° to 200° C. The other various known methods of decomposing carboxylic acid groups such as an oxidation, a reduction, an arc discharging treatment, an ionized radiation treatment and a flame treatment, can be also employed.

In the modification of the surface layer of the cation exchange membrane in the present invention, the ion exchange capacity in the modified surface layer is decreased to be from 45 to 95% especially 50 to 90% based on the ion exchange capacity of the nonmodified cation exchange membrane.

In the present invention, the conditions for the electrolysis of an aqueous solution of an alkali metal chloride especially sodium chloride can be the conventional ones in the membrane electrolysis. It is preferable to employ the conditions of an electrolytic voltage of 2.3 to 5.5 volt and a current density of 5 to 80 A/dm² especially 15 to 50 A/dm² and an electrolytic temperature of 75° to 105° C. especially 85° to 95° C.

The anode used in the electrolysis can be graphite or an anticorrosive electrode having dimensional stability which is made of a titanium substrate coated with a platinum group metal or an oxide of a platinum group metal.

The electrolytic cell system can be monopolar or bipolar type.

A further understanding can be obtained by reference to certain specific examples which are provided herein for purposes of illustration only and are not intended to be limiting unless otherwise specified.

In the examples, the ion exchange capacity of the cation exchange membrane is measured as follows.

A cation exchange membrane is immersed into 1 N-HCl at 60° C. for 5 hours to completely convert it to an H-type membrane, and then, the membrane is washed with water to be free of HCl. Then, 0.5 g of the H-type membrane is immersed into a solution prepared by adding 25 ml of water to 25 ml of 0.1 N-NaOH to completely convert it to a $Na^+$ type membrane and then, the membrane is taken out and the amount of NaOH in the solution is measured by a back titration with 0.1 N-HCl.

The volumetric melt flow rate is measured by extruding a polymer having carboxylic acid methyl ester groups through a nozzle having a diameter of 1 mm and a length of 2 mm under a pressure of 30 kg/cm² by a flow tester and is shown in unit of mm³/sec.

EXAMPLES 1 AND 2

A cation exchange membrane obtained by hydrolyzing a copolymer of $C_2F_4$ and $CF_2=CF-O-(CF_2)_3-COOCH_3$ (a thickness of 300μ and an ion exchange capacity of 1.65 meq/g) was disposed to compose a two compartments cell made of nickel. In one compartment, 25 wt.% of sodium hydroxide was charged and in the other compartment, 50 wt.% of sodium hydroxide was charged and they were kept at 100° C. for 16 hours.

A part of the modified membrane was cut out and a multiple reflection infrared absorption spectrum of sample was measured. As the result, in the spectrum of the surface layer of the membrane which was contacted with 25% sodium hydroxide, there was no change whereas in the spectrum of the surface layer of the membrane which was contacted with 50 wt.% sodium hydroxide, the absorptions of $-CF_2H$ groups and $Na_2CO_3$ were found as well as the absorption of $-COO^-$ groups.

The membrane was treated to convert it to $Ca^{++}$ type by an ion exchange and the distribution of ion exchange capacity in the sectional direction of the membrane was measured by a X-ray microanalyzer. As the result, it was found that the ion exchange capacity of the surface layer for a thickness of 15μ in the side contacted with 50 wt.% of sodium hydroxide was reduced to 1.25 meq/g. dry polymer.

The modified membrane was set in two compartment electrolytic cell (two cells) so as to face the modified surface to the cathode and each electrolysis producing sodium hydroxide was carried out to obtain two products having different concentration. The results are shown in Table 1.

The modified cation exchange membrane whose one surface layer had smaller ion exchange capacity was used for partitioning an anode and a cathode to form a two compartment type electrolytic cell wherein a ruthenium coated titanium electrode was used as the anode and a nickel-plated stainless steel electrode was used as the cathod and a distance between the electrodes was 5 mm and an effective area of the membrane was 25 cm². Two kinds of the electrolysis of sodium chloride were respectively carried out so as to obtain sodium hydroxide in a concentration of 35 wt.% or 40 wt.%.

The electrolysis was carried out by feeding 5 N-NaCl aqueous solution at a rate of 150 ml/hour into the anode compartment and feeding water into the cathode compartment so as to give the specified concentration of sodium hydroxide to be produced, at 90° C. in a current density of 30 A/dm². An aqueous solution of sodium chloride was overflowed from the anode compartment whereas an aqueous solution of sodium hydroxide overflowed from the cathode compartment was collected and the current efficiency was measured from the amount of the resulting sodium hydroxide. The cell voltage was also measured. The results are shown in Table 1.

As the references, the two kinds of the electrolysis for producing different concentrations of sodium hydroxide were carried out in the same manner except using the non-modified cation exchange membrane.

The results are also shown in Table 1.

TABLE 1

| | Time for electrolysis (days) | 10 | 30 | 60 | 180 |
|---|---|---|---|---|---|
| | NaOH concentration (%) | 35 | 35 | 35 | 35 |
| Example 1 | Voltage (V) | 3.4 | 3.4 | 3.4 | 3.4 |
| | Current efficiency (%) | 96 | 96 | 96 | 96 |
| | NaOH concentration (%) | 40 | 40 | 40 | 40 |
| Example 2 | Voltage (V) | 3.5 | 3.5 | 3.5 | 3.5 |
| | Current efficiency (%) | 97 | 97 | 97 | 97 |
| | NaOH concentration (%) | 35 | 35 | 35 | 35 |
| Reference 1 | Voltage (V) | 3.3 | 3.3 | 3.3 | 3.3 |
| | Current efficiency (%) | 88 | 88 | 88 | 88 |
| | NaOH concentration (%) | 40 | 40 | 40 | |
| Reference 2 | Voltage (V) | 3.4 | 3.4 | 3.4 | |
| | Current efficiency (%) | 91 | 91 | 91 | |

The contents of NaCl in the resulting aqueous solution of sodium hydroxide after the operation for 180 days (calculated for 50% NaOH) were respectively 15 ppm, 10 ppm, 100 ppm and 50 ppm in Examples 1 and 2 and References 1 and 2.

EXAMPLE 3

Two sheets of cation exchange membranes made of a copolymer of $CF_2=CF_2$ and $CF_2=CFO(CF_2)_3COOCH_3$ (an ion exchange capacity of 1.80 meq/g; $T_Q$ of 200° C.; a thickness of 300μ; a size of 10 cm×10 cm) were superposed and bonded by pressing at room temperature under a pressure of 5 kg/cm².

The bonded unit was dipped in 45% NaOH aqueous solution at 110° C. for 72 hours and then, the treated bonded unit was completely hydrolyzed by dipping it in 25% NaOH aqueous solution at 90° C. for 16 hours. The two sheets of the membranes of the bonded unit were easily peeled off.

The modified surface layer of the cation exchange membrane contacted with 45% NaOH aqueous solution was analyzed by the X-ray microanalyzer.

It was found that the ion exchange capacity of the modified surface layer in a thickness of 30μ was decreased to 1.35 meq/g. dry polymer.

In accordance with the process of Example 1, an electrolytic cell was assembled by facing the modified surface layer of the cation exchange membrane to a cathode and 5.0 N-NaCl aqueous solution was fed to the anode compartment and the concentration NaOH in the cathode compartment was maintained to 40% and the electrolysis was carried out under a current density of 20 A/dm². The current efficiency was 96% and the cell voltage was 3.1 V.

On the other hand, the electrolysis using non-modified cation exchange membrane made of same copolymer was carried out. The current efficiency was 90% and the cell voltage was 3.0 V.

EXAMPLE 4

Two sheets of cation exchange membranes made of a copolymer of $CF_2=CF_2$ and $CF_2=CFO(CF_2)_3COOCH_3$ (an ion exchange capacity of 1.50 meq/g; $T_Q$ of 230° C.; a thickness of 300μ; a size of 10 cm×10 cm) were superposed and bonded by pressing at room temperature under a pressure of 5 kg/cm².

The bonded unit was dipped in 50% NaOH aqueous solution at 100° C. for 40 hours and then, the treated bonded unit was completely hydrolyzed by dipping it in 25% KOH aqueous solution at 90° C. for 16 hours. The two sheets of the membranes of the bonded unit were easily peeled off.

The modified surface layer of the cation exchange membrane contacted with 60% KOH aqueous solution was analyzed by the X-ray microanalyzer.

It was found that the ion exchange capacity of the modified surface layer in a thickness of 10μ was decreased to 1.20 meq/g. dry polymer.

In accordance with the process of Example 1, an electrolytic cell was assembled by facing the modified surface layer of the cation exchange membrane to a cathode and 5.0 N-NaCl aqueous solution was fed to the anode compartment and the concentration of NaOH in the cathode compartment was maintained to 35% and the electrolysis was carried out under a current density of 20 A/dm$^2$. The current efficiency was 97% and the cell voltage was 3.2 V.

On the other hand, the electrolysis using non-modified cation exchange membrane made of same copolymer was carried out. The current density was 94% and the cell voltage was 3.2 V.

EXAMPLE 5

Two sheets of cation exchange membranes made of a copolymer of $CF_2=CF_2$ and $CF_2=CFO(CF_2)_3COOCH_3$ (an ion exchange capacity of 1.8 meq/g; $T_Q$ of 200° C.; a thickness of 300μ; a size of 10 cm × 10 cm) were superposed and bonded by pressing at room temperature under a pressure of 5 kg/cm$^2$.

The bonded unit was dipped in 60% KOH aqueous solution at 120° C. for 16 hours and then, the treated bonded unit was completely hydrolyzed by dipping it in 25% KOH aqueous solution at 90° C. for 16 hours. The two sheets of the membranes of the bonded unit were easily peeled off.

The modified surface layer of the cation exchange membrane contacted with 60% KOH aqueous solution was analyzed by the X-ray microanalyzer.

It was found that the ion exchange capacity of the modified surface layer in a thickness of 5μ was decreased to 1.40 meq/g. dry polymer.

In accordance with the process of Example 1, an electrolytic cell was assembled by facing the modified surface layer of the cation exchange membrane to a cathode and 3.5 N-KCl aqueous solution was fed to the anode compartment and the concentration of KOH in the cathode compartment was maintained to 35% and the electrolysis was carried out under a current density of 20 A/dm$^2$. The current efficiency was 95% and the cell voltage was 3.2 V.

On the other hand, the electrolysis using non-modified cation exchange membrane made of same copolymer was carried out. The current efficiency was 91% and the cell voltage was 3.1 V.

EXAMPLE 6

Two sheets of cation exchange membranes made of a copolymer of $CF_2=CF_2$ and $CF_2 50$ $CFOCF_2CF(CF_3)O(CF_2)_3COOCH_3$ (a thickness of 300μ and an ion exchange capacity of 1.4 meq/g) were superposed and bonded by pressing at room temperature under a pressure of 10 kg/cm$^2$.

The bonded unit was dipped in 50% NaOH aqueous solution al 110° C. for 16 hours and then, the treated bonded unit was completely hydrolyzed by dipping it in 25% NaOH aqueous solution at 90° C. for 16 hours.

The two sheets of the membranes of the bonded unit were easily peeled off.

The modified surface layer of the cation exchange membrane contacted with 50% NaOH aqueous solution was analyzed by the X-ray microanalyzer.

It was found that the ion exchange capacity of the modified surface layer in a thickness of 15μ was decreased to 1.1 meq/g. dry polymer.

In accordance with the process of Example 1, an electrolytic cell was assembled by facing the modified surface layer of the cation exchange membrane to a cathode and 5 N-NaCl aqueous solution was fed to the anode compartment and the concentration of NaOH in the cathode compartment was maintained to 35% and the concentration of NaCl in the anode compartment was maintained to 3 N and the electrolysis was carried out under a current density of 20 A/dm$^2$. The current efficiency was 96% and the cell voltage was 3.1 V.

We claim:

1. An electrolysis of an aqueous solution of an alkali metal chloride to produce an alkali metal hydroxide having a concentration of 30 wt.% or more and chlorine which comprises using a modified cation exchange membrane of a fluorinated polymer having essentially only carboxylic acid type ion exchange groups which has an ion exchange capacity of 1.0 to 2.2 meq/g. dry polymer and wherein one surface layer has a lower ion exchange capacity than that of the major portion of the membrane and is from 0.9 to 1.6 meq/g. dry polymer.

2. An electrolysis according to claim 1 wherein the ion exchange capacity of the modified surface layer of the modified cation exchange membrane of a fluorinated polymer is in a range of 1.0 to 1.5 meq/g. dry polymer which is in a range of from 45 to 95% based on the ion exchange capacity of the non-modified parts.

3. An electrolysis according to claim 1 or 2 wherein the modified surface layer having lower ion exchange capacity in the modified cation exchange membrane of a fluorinated polymer is in a thickness of at least 0.1μ from the surface.

4. An electrolysis according to claim 1, or 2 wherein the ion exchange capacity of the surface layer is decreased by contacting with an aqueous solution of an alkali metal hydroxide in a concentration of higher than 40 wt.% at higher than 80° C.

5. An electrolysis according to claim 4 wherein at least peripheral parts of two sheets of the cation exchange membrane are bonded to form a bonded unit and the bonded unit is dipped into an aqueous solution of an alkali metal hydroxide to decrease the ion exchange capacity.

6. An electrolysis according to claim 5 wherein the ion exchange groups of the cation exchange membrane are carboxylic acid ester groups.

7. An electrolysis according to claim 4 wherein the surface layer of the cation exchange membrane of a fluorinated polymer is contacted with an aqueous solution of an alkali metal hydroxide in an electrolytic cell.

8. An electrolysis according to claim 1, or 2 wherein the modified surface layer of the modified cation exchange membrane of a fluorinated polymer is faced to a cathode side in an electrolytic cell.

9. An electrolysis according to claim 1, or 2 wherein the cation exchange membrane of a fluorinated polymer which has an ion exchange capacity of carboxylic acid group type ion exchange groups of 0.9 to 2.2 meq/g. dry polymer is made of a copolymer having units (a) and units (b):

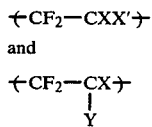 (a)

and

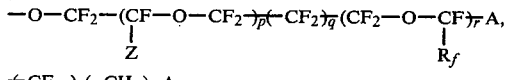

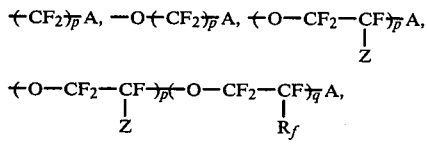 (b)

wherein X represents fluorine, chlorine, hydrogen or —CF$_3$; X' represents X or CF$_3$(CF$_2$)$_m$; m represents 1 to 5; and Y represents $$\text{--(CF}_2\text{)}_{\overline{p}}\text{A}, \quad -\text{O(CF}_2\text{)}_{\overline{p}}\text{A}, \quad \text{--O--CF}_2\text{--CF}_{\overline{p}}\text{A},$$
$$\underset{Z}{|}$$

$$\text{--O--CF}_2\text{--CF}_{\overline{p}}\text{--O--CF}_2\text{--CF}_{\overline{q}}\text{A},$$
$$\underset{Z}{|} \qquad \underset{R_f}{|}$$

$$-\text{O--CF}_2\text{--(CF--O--CF}_2)_{\overline{p}}\text{--CF}_2)_{\overline{q}}(\text{CF}_2\text{--O--CF})_{\overline{r}}\text{A},$$
$$\underset{Z}{|} \qquad\qquad\qquad\qquad \underset{R_f}{|}$$

$$\text{--(CF}_2)_{\overline{p}}\text{--CH}_2)_{\overline{q}}\text{A};$$

p, q and r respectively represent 1 to 10; Z and R$_f$ respectively represent —F or a C$_1$-C$_{10}$ perfluoroalkyl group; A represents a functional group which can be converted to —COOM in a hydrolysis or a neutralization such as —CN, —COF, —COOR$_1$ and —CONR$_2$R$_3$; R$_1$ represents a C$_1$-C$_{10}$ alkyl group; M represents hydrogen or an alkali metal atom and R$_2$, and R$_3$ respectively represents hydrogen or a C$_1$-C$_{10}$ alkyl group.

10. An electrolysis according to claim 1 wherein the concentration of the resulting alkali metal hydroxide is in a range of 35 to 40 wt.%.

* * * * *